United States Patent [19]

Rolt

[11] Patent Number: 4,856,690
[45] Date of Patent: Aug. 15, 1989

[54] TRANSMISSION OF ROTARY POWER, PARTICULARLY IN PRINTING MACHINES

[76] Inventor: Richard C. Rolt, Stanley Pontlarge, Nr. Winchcombe, Gloucestershire, GL54 5HD, Great Britain

[21] Appl. No.: 74,863

[22] Filed: Jul. 17, 1987

[30] Foreign Application Priority Data

Jul. 17, 1986 [GB] United Kingdom ............... 8617498

[51] Int. Cl.⁴ ................... B65H 20/00; F16D 21/02
[52] U.S. Cl. .................................. 226/24; 226/30; 192/48.91
[58] Field of Search ............ 226/24, 30, 37, 31, 226/40, 36, 95; 74/661, 665 A, 665 B; 192/48.91, 85 C

[56] References Cited

U.S. PATENT DOCUMENTS

| | | | |
|---|---|---|---|
| 1,563,612 | 12/1925 | Culler et al. | 226/24 X |
| 2,168,960 | 8/1939 | Morris | 192/48.91 |
| 2,541,872 | 2/1951 | Hendricks | 192/48.91 |
| 2,832,234 | 4/1958 | Sinclair | 192/48.91 |
| 3,197,103 | 7/1965 | Rayve | 226/37 |
| 3,589,578 | 6/1971 | Kamphausen | 226/40 |
| 4,009,072 | 2/1977 | Schultz et al. | 226/108 X |
| 4,249,688 | 2/1981 | Klemm | 226/30 X |

*Primary Examiner*—David Werner
*Attorney, Agent, or Firm*—A. W. Breiner

[57] ABSTRACT

In printing machines, it is often necessary to move materials at two different speeds, for example, bulk movement from one station to another, and precise movement to effect registration for printing. Disclosed herein is apparatus for transmitting power to a drum from two motors via a single output shaft. The apparatus includes a shaft having a coupling disc at one end which can move axially under the control of an actuator either to engage a flywheel driven by a high speed motor or a drive ring driven by a stepper motor via a gear. The other end of the shaft has a gear which transmits the motor drive to the drum via a gear attached to the drum shaft.

9 Claims, 2 Drawing Sheets

{ #4,856,690}

TRANSMISSION OF ROTARY POWER, PARTICULARLY IN PRINTING MACHINES

BACKGROUND OF THE INVENTION

This invention relates to transmission of rotary power, particularly in printing machines.

In printing machines, particularly though not exclusively in web fed printing machines, there is often a need to move materials printed in two different ways, first a bulk movement fashion e.g. from one printing station to another and secondly to a much smaller extent and generally slower, to position materials to be printed exactly. Mechanical systems for effecting bulk movement do not lend themselves easily to effecting precise positioning and vice versa. Attempts have been made to use dual motion systems in printing presses, for example that shown in U.S. Specification No. 4249688. That specification discloses for example in FIGS. 5 and 6 a system employing a main electric motor and a so called correction electromotor, each of which can be coupled to or de-coupled from a shaft driving a feed drum.

SUMMARY OF THE INVENTION

According to one aspect of the present invention, there is provided apparatus for transmitting rotary movement comprising first and second rotating disc members, and a power output shaft co-axial with the first rotating disc, the output shaft being axially movable from a first position in which it is engaged to rotate with the first disc member via a second position in which it is engaged to rotate with neither disc member to a third position in which it is engaged to rotate with the second disc member.

Advantageously, the first rotating disc member is annular and the output shaft passes through to its centre.

Preferably the engagement is frictional and is effected between the first and second rotating disc members and a further disc member rigidly fixed to the power output shaft. Annular frictional disc members may be interposed between the disc members.

The rotating disc members are connected to respective power input shafts which are preferably located in and fixed axially in a suitable housing, with the output shaft located axially movable relative to the housing to bring it into and out of engagement with the respective rotating disc members.

In a particularly preferred embodiment of the invention, and the second power input shaft is connected via gearing to a motor, most preferably a stepping motor. Provided that the ratio of the gearing is sufficiently high, this renders the second power input shaft effectively stationary and accordingly the power output shaft, if desired, may be brought into engagement therewith thus braking rotary motion of the power output shaft. This is of particular value in application where it is desired to transmit power from a substantial size power source e.g. a large capacity motor to a powered device and then when desired rapidly to brake the rotation of that device. Particularly if the device being driven has substantial inertia, this can be very useful.

Axial motion of the output shaft is preferably effected using servo-operated hydro-mechanical or pneumatic valves. These are produced in a wide variety of sizes and types, and are available in commerce with very feet response times.

The power transmission apparatus of the present invention is of particular value in printing machinery where substantial power is required to transport material to be printed to an approximate desired position, whereafter it is desired accurately to position materials to be printed by effecting adjustment movements. Using the power transmission device of the present invention, a continuous running high powered motor may be intermittently connected to a web or sheet fed printing press to advance a web or sheets of material to be printed therein, but as soon as adequate advance has been achieved, the final positioning may be achieved under the control of a low power, high accuracy controllable motor with speed and efficiency.

According to a further aspect of the invention, there is provided a web-fed printing press comprising:
 a rotatable drum on which the web is advanced;
 first and second motors;
 first and second power input shafts connected to transmit power from respective ones of the first and second motors;
 a power output shaft positioned co-axially with the first input shaft and operable to transmit power from either input shaft to the drum, the output shaft being axially movable between a first position in which it is in engagement for rotation with the first input shaft, and a second position in which it is in engagement for rotation with the second input shaft;
 actuator means for axially moving the output shaft; and
 actuator means for controlling the actuator means and the first and second motors to rotate the drum.

DETAILED DESCRIPTION OF PREFERRED EMBODIMENTS

Figure 1:
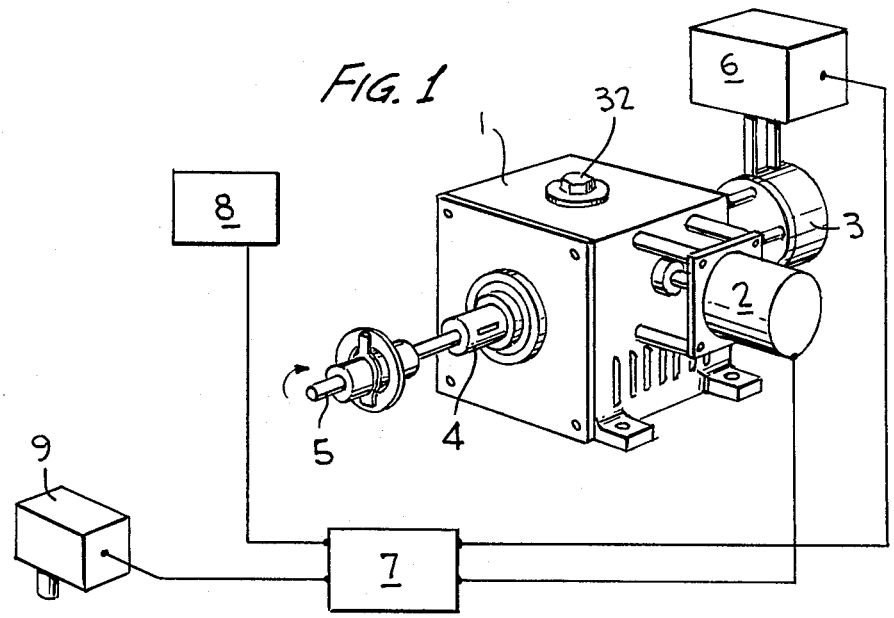
FIG. 1 is a diagrammatic perspective view of a power transmission unit for use in an intermittent feed printing press.
Figure 2:
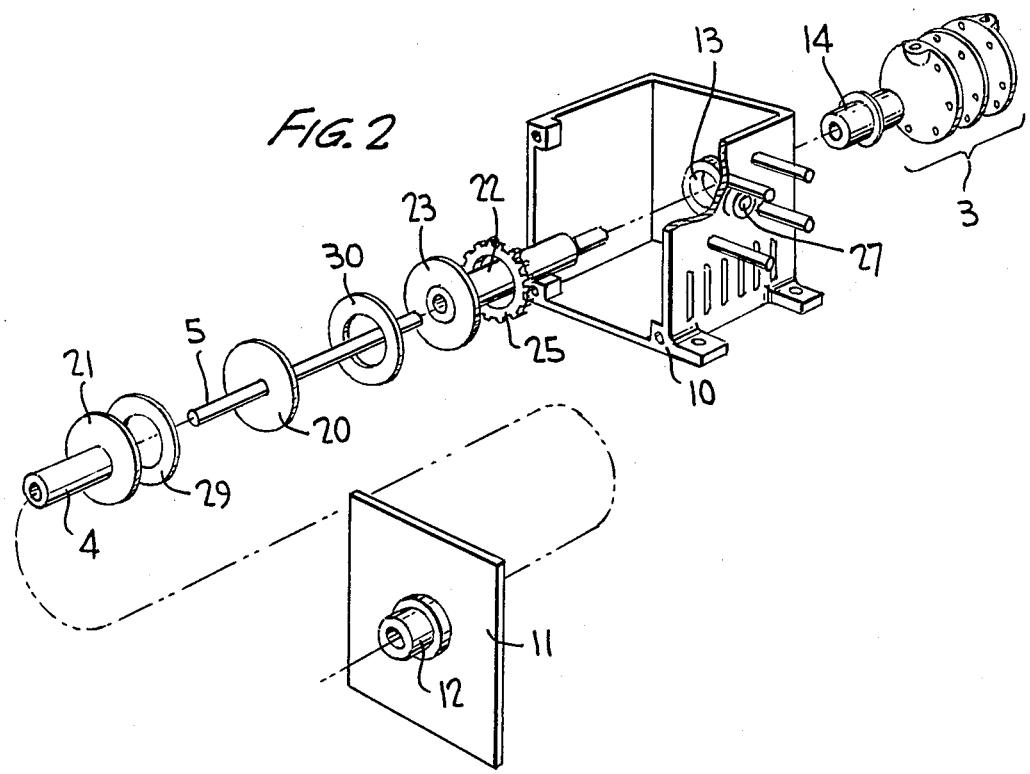
FIG. 2 is an exploded view of the main components of the transmission device of FIG. 1.

Referring first to FIGS. 1 and 2, this shows in a perspective view with certain associated equipment the device of the invention (in FIG. 1) and the device in exploded form in FIG. 2, with various members omitted for the sake of simplicity.

Referring first to FIG. 1, the device consists of a substantially constructed oil filled housing 1 having a stepping motor 2 mounted on one side, an hydraulic actuator 3 mounted on one end and, opposite hydraulic actuator 3, and mounted in suitable bearings, a first input shaft 4 and co-axially therewith an output shaft 5.

A servo control unit 6 is connected to the hydraulic actuator 3 hydraulically and electrically to a central control unit 7. This control unit may receive inputs e.g. from the electrical control system of machine, diagrammatically simply indicated by box 8, and e.g. from a photo-electric detector 9.

By the use of hydraulic actuator 3, the output shaft 5 can be moved axially so that it either rotates with input shaft 4, or it is rotated by means of the stepping motor 2, which stepping motor is powered from the control circuitry 7.

How this is accomplished is more clearly evident from the exploded view of the main components of the device as shown in FIG. 2. As shown in this drawing, casing 1 has been broken into a main section 10 and a cover plate 11 which includes an appropriate bearing 12 in which input shaft 4 rotates. Output shaft 5 passes through the middle of input shaft 4 which may be provided with appropriate bearings to enable rotation to take place.

The end of output shaft 5 remote from plate 11 is mounted in a rotating dog 14 which turns in a bearing 13 in the wall of casing 10. Rotating dog 14 may be moved axially by means of hydraulic actuator 3, various diaphragms of which are diagrammatically shown in the exploded view of FIG. 2.

Output shaft 5 has fixed centrally on it a disc 20. Input shaft 4 has a similar sized disc 21 mounted thereon and the device also includes a stub shaft 22 on which is fixedly mounted a further disc 23. Stub shaft 22 is journaled in bearing 13 also, and is surrounded by a toothed ring 25. Toothed ring 25 may be brought e.g. by means of appropriate pin or other engagement, to be rotationally fixed relative to disc 23.

Ring 25 has teeth on its outer periphery which constitute one half of a worm gear. The other half, not shown in FIG. 2, is constituted by a worm mounted on the output shaft of stepping motor 2. This motor is mounted on four mounting studs on the exterior of casing 10 and its output shaft passes through a bearing 27 set in the wall of casing 10.

Freely located between discs 20 and 21 is an annular friction disc 29 and likewise between 20 and 23 a second annular friction disc 30.

In practice, the various components shown in FIG. 2 are telescoped together with face plate 11 bolted onto casing 10, and the casing is filled with an appropriate liquid via a filling cap 32.

The dimensions of the various components are such that the output shaft 5 may be turned with disc 20 freely turning located between discs 21 and 23, and with the impositions of annular friction discs 29 and 30, with play between all of those five discs. If, using the hydraulic actuator 3, disc 20 is urged towards disc 23, then those two discs, frictionally connected together via discs 30, will rotate together. Likewise if shaft 5 is moved in the opposite direction by hydraulic actuator 3, so that discs 20 and 21 compress disc 29 between them, then the input shaft 4 will cause the output shaft 5 to rotate in the same sense with the same speed.

Figure 3:
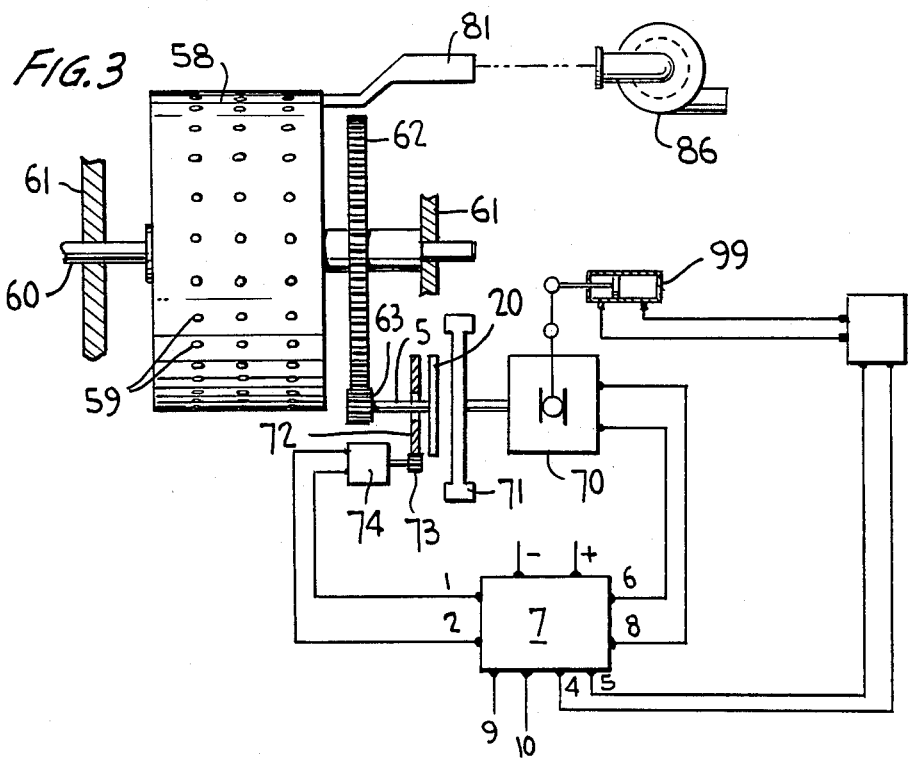
FIGS. 3 and 4 are diagrammatic end views and side views of a web fed screen printing press incorporating such a device.
Figure 4:
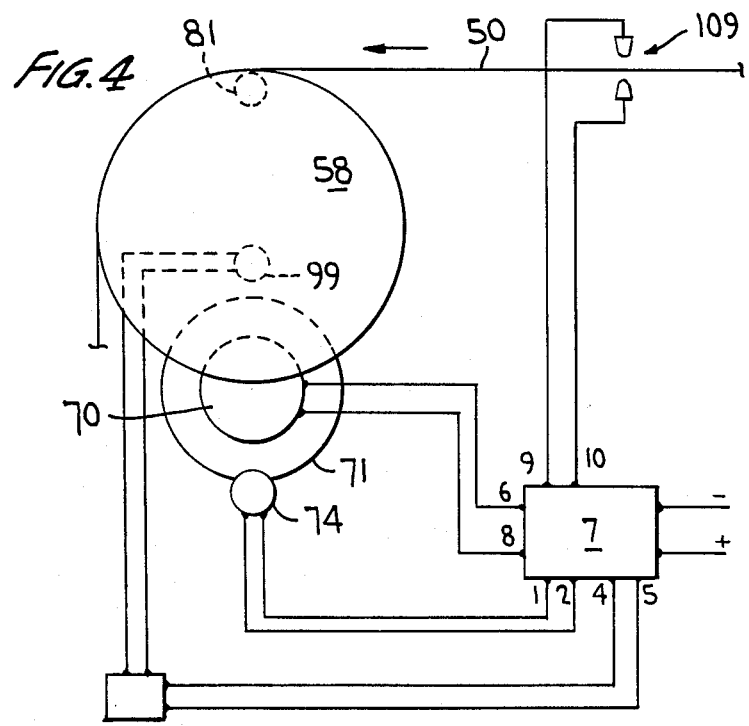

FIGS. 3 and 4 show a practical application of such a device diagrammatically. The application is in the field of a printing press in which a web of material 50 is to be advanced through the press by means of a drive drum 58. It is desired to advance web 50 intermittently, and accurately to position the web after each advance. For this purpose, it is desired to move drum 58 in a first substantial rotary movement, and finally with a slow speed final adjustment movement to bring the web 50 into the desired position.

Drum 58 engages the web by suction. The surface of the drum 58 is provided with rows of suction apertures 59, each of which is connected to a manifold running parallel to the axis of drum 58 and having a main aperture to which suction may be applied and which main aperture is on the periphery of the drum at its end. The main aperture thus constitutes a ring around the periphery of the end of the drum and they may be connected to a source of suction via a manifold 81 which is in turn connected to a suction fan 86. Manifold 81 is fixed in order to provide suction e.g. only over that approximate quadrant of the surface of drum 58 which is contact with web 50.

Drum 58 is mounted on a shaft 60 set in the machine frame 61 of the printing press. It is driven by means of a spur gear 62 in turn driven by a small diameter spur gear 63. Gear 63 is mounted on output shaft 5 of the power transmission device according to the invention.

As can be seen from FIG. 3, output shaft 5 has a disc 20 on it which may be brought into driving engagement either with a high power motor 70 with a flywheel 71 or with a drive ring 72 driven by a gear 73 on the output shaft of the stepping motor 74.

A hydraulic or pneumatic actuator 99 acts via a suitable mechanical system to move output shaft 5 axially to engage as desired. Actuator 99 is controlled from a suitable control unit 7 which receives inputs from various sensors attached to the printing press and which additionally controls motors 70 and 74.

In the use of the apparatus shown in FIGS. 3 and 4, main drive motor 70 is permanently connected to flywheel 71 and driven at an even high speed. Using pneumatic actuator 99 under control of the electronics in control unit 7, output shaft 5 may be made to rotate with flywheel 71 and accordingly shaft 60 is driven via gears 62, 63 to move with 50 in a high speed fashion. This occurs until a signal is received via sensor 109 which is connected to control circuitry 7 which on receipt of an appropriate signal causes actuator 99 to de-couple disc 20 from flywheel 71 and engage it with the drive from the stepping motor 74. Such engagement causes the drum 58 and associated equipment to stop, i.e. it acts as a brake, whereafter stepping motor 74 can be actuated to bring the web 50 into its finally desired position. At this stage, e.g. an appropriate printing operation is carried out on web 50, whereafter an appropriate signal is emitted from somewhere on the machine to cause the sequence of high speed movement and slow speed final positioning movement to be repeated.

I claim:

1. Apparatus for transmitting rotary movement comprising:
    a first power input shaft;
    a second power input shaft;
    a first annular disc member fixed to said first power input shaft;
    a second disc member fixed to said second power input shaft;
    a power output shaft; and
    a third disc member carried on said power output shaft, with said power output shaft being coaxial with said first power input shaft and passing through the center of said first annular disc member, and being axially movable along their common axis between a first position in which said third disc member engages said first annular disc member to transmit power from said first power input shaft to said output shaft, and a second position in which the third disc member engages the second disc member and transmits power from said second power input shaft to said output shaft via a neutral position in which neutral position neither of the first and second disc members is engaged by the third disc member.

2. Apparatus according to claim 1, wherein engagement between the third disc member and the first disc member, and the third disc member and the second disc member is frictional.

3. Apparatus according to claim 2, wherein a first annular, frictional disc member is interposed between the first disc member and the third disc member, and a second annular, frictional disc member is interposed between the second disc member and the third disc member, the first and second annular, frictional disc members providing the frictional engagement.

4. Apparatus according to claim 1, wherein the second input shaft is an output shaft of a motor.

5. Apparatus according to claim 1, wherein the second power input shaft is connected to a motor via gearing.

6. Apparatus according to claim 5, wherein the motor is a stepper motor.

7. Apparatus according to claim 5, wherein the second disc member includes a toothed ring operable to be fixed rotationally relative to the second disc member and which ring forms part of the gearing.

8. Apparatus according to claim 1, wherein the first and second power input shafts are axially located for rotation in a housing.

9. A web-fed printing press comprising:
a rotatable drum for advancing a web;
first and second motors;
first and second power input shafts connected to transmit power from respective ones of said first and second motors;
first and second disc members connected to respective ones of said first and second power input shafts;
a power output shaft positioned coaxially with respect to said first input shaft;
a third disc member carried on said output shaft, the output shaft and the third disc member being axially movable between a first position in which the third disc member is in engagement for rotation with the first input shaft, and a second position in which the third disc member is in engagement for rotation with the second input shaft;
actuator means for coaxially moving the output shaft and third disc member between the first and the second position; and
control means for controlling the actuator means and the first and second motors to rotate the drum.

* * * * *